E. H. BECHBERGER.
NUT LOCK.
APPLICATION FILED NOV. 4, 1916. RENEWED MAY 11, 1918.
1,281,122.
Patented Oct. 8, 1918.
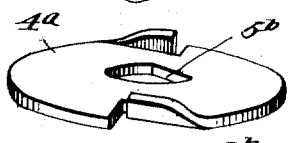
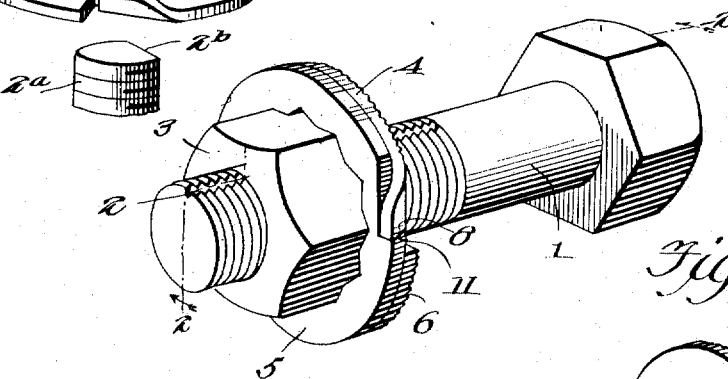
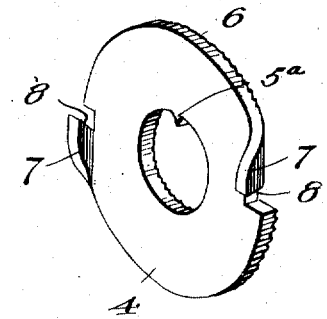
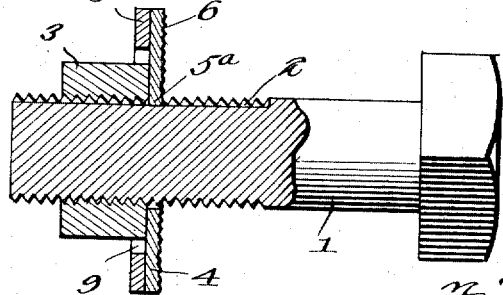
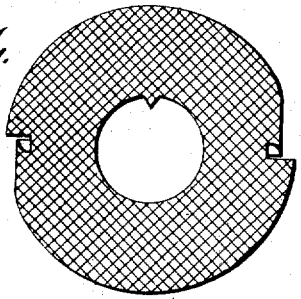
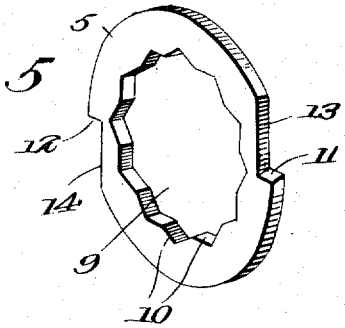
Inventor
E. H. Bechberger,
By Victor J. Evans
Attorney
Witness
Hugh H. Ott

UNITED STATES PATENT OFFICE.

EARL H. BECHBERGER, OF CLEVELAND, OHIO.

NUT-LOCK.

1,281,122. Specification of Letters Patent. Patented Oct. 8, 1918.

Application filed November 4, 1916, Serial No. 129,563. Renewed May 11, 1918. Serial No. 234,014.

*To all whom it may concern:*

Be it known that I, EARL H. BECHBERGER, a citizen of the United States, residing at Cleveland, in the county of Cuyahoga and State of Ohio, have invented new and useful Improvements in Nut-Locks, of which the following is a specification.

The present invention relates to improvements in means for locking a nut upon a bolt.

In carrying out my invention, it is my purpose to provide locking means comprising two washer members, one of which engaging with the bolt or with the superstructure connected by the bolt, the other engaging with the nut and co-engaging with the first mentioned washer in such a manner as to lock the bolt on the washer and consequently lock the nut upon the bolt.

It is also my purpose to produce a locking means for retaining a nut upon a bolt which may be readily operated to release the nut from the bolt when desired.

With the above and other objects in view, the improvement resides in the construction, combination and arrangement of parts set forth in the following specification and falling within the scope of the appended claim.

In the drawing:

Figure 1 is a perspective view illustrating a nut and bolt locked in accordance with the present invention, Fig. 2 is a sectional view approximately on the line 2—2 of Fig. 1, Fig. 3 is a perspective view of one of the locking elements, Fig. 4 is a rear elevation of the same, Fig. 5 is a perspective view of the second locking element, and Fig. 6 is a perspective view illustrating a slightly modified construction of the washer and the bolt therefor.

In the accompanying drawing, the numeral 1 designates a bolt of any ordinary construction which has its shank, for a portion of its length provided with the usual threads and the threaded portion of the shank, in the present instance, is grooved longitudinally as at 2. In some instances, as will hereinafter be apparent, the groove 2 may be dispensed with. The numeral 3 designates the nut which is screwed upon the bolt 1 and which may be of any ordinary construction.

The locking means includes an inner washer 4 and an upper or lock washer 5. In this connection, it is desired to be stated that while the members 4 and 5 will, for the sake of convenience be hereinafter referred to as washers, and while the same have been illustrated as being rounded, the said members may be constructed of flat plates, if desired.

The washer 4 is provided with a lug $5^a$ projecting within its central opening, and this lug is adapted to be received in the groove 2 of the bolt 1 when the washer is arranged upon the said bolt. The inner face of the washer 4 is roughened or serrated as at 6, whereby, when the same contacts with the plate or superstructure connected by the bolt and is forced into tight engagement with the structure, the teeth or serrations 6 will enter the structure and hold the washer against movement. In such instances, when the nut and bolt are subjected to only a slight degree of vibration the lug $5^a$ of the washer 4 and the groove 2 in the bolt 1 may be dispensed with.

The washer 4, preferably at diametrically opposed points thereon is slitted angularly toward the center of the washer, and the diagonally opposed edges of the washer, with respect to the said slits is bent outwardly, providing lugs 7 which have their inner edges disposed at an inclination or angle as indicated by the numerals 8. It is, of course, to be understood that the washer 4 is arranged upon the bolt before the nut 3 is screwed home upon the said bolt, and the homeward screwing of the nut contacting with the washer will force the washer into tight engagement with the superstructure.

The second or locking washer 5 is centrally provided with an opening of an irregular formation, that shown in the drawings being of what may be termed a double hexagon formation and is indicated by the numeral 9. The wall provided by the opening 9, it will be noted, comprises a plurality of substantially V-shaped connecting members 10, and the arrangement is such that the washer may be applied to nuts having any number of sides. The washer 5, at diametrically opposed points, is cut angularly toward the center thereof, the said angular cuts being at opposite pitches, providing shoulders 11 and 12 respectively. The said washer is further cut longitudinally as at 13 and 14 at a right angle with respect to the angular cuts 11 and 12, said cuts 13 and 14 extending in opposite directions and terminating at the terminal of the angular cuts 11 and 12. By this arrangement it will be noted that the washer 5 is provided at diagonally opposite points with substantially L-shaped depressions and with the oppositely extending shoulders 11 and 12.

As stated, the washer 4 is arranged upon the bolt and the nut is secured home upon the bolt contacting with the said washer to force the same upon the superstructure. The washer 5 is now arranged over the bolt 3 and the shoulders 11 and 12 are disposed a slight distance from the shoulders 8 of the washer 4. A slight movement in an unscrewing direction will cause the shoulders 11 and 12 of the washer 5 to engage with the angular shoulders 8 of the washer 4 and thus lock the washers connected and hold the nut in locked position upon the bolt. It will be apparent that when the nut is turned in a homeward direction, the distance required to permit of the co-engagement of the shoulders with the washers 4 and 5 the said shoulders will be brought away from the nut, permitting the washer 5 to be removed and allowing the nut to be unscrewed from the bolt. It will also be apparent that in instances when the washer 5 is of a less thickness than the washer 4, the angular arrangement of the shoulders 11 and 12 will not be required, as the straight shoulders upon the washer 5 would then underlie the shoulders 8 upon the washer 4, and from the above description, taken in connection with the accompanying drawing, the simplicity of the device as well as the advantages thereof will, it is thought, be perfectly apparent to those skilled in the art to which such invention appertains without further detailed description.

As disclosed in Fig. 6 of the drawings the washer 4ª may have its rounded wall terminating in a flat surface 5ᵇ, and the shank of the bolt 2ª may have one of its sides or surfaces flattened, as at 2ᵇ, to contact with the surface 5' provided in the opening in the washer 4ª.

Having thus described the invention, what is claimed as new, is:

In combination with a bolt and a nut screwed upon the bolt, of a locking means between said nut and bolt comprising an inner washer co-engaging with the bolt and having an inner serrated face, and an outer washer, both of said washers comprising peripherally rounded members, the inner washer being slitted inwardly from its periphery at diametrically opposite points, and being bent angularly from said slits to form oppositely arranged, outwardly extending lugs and shoulders inward of said lugs, the outer washer having the central opening therein provided with a plurality of substantially V-shaped connected members, and the angular walls provided by certain of the said members designed to receive the edges of the perimeter of the nut, said second mentioned washer having its periphery provided with oppositely extending L shaped depressions, the shorter walls of which form longitudinal shoulders, and such shoulders adapted to be engaged by the shoulders of the lugs of the first mentioned washer, whereby to lock the second mentioned washer on the first mentioned washer.

In testimony whereof I affix my signature.

EARL H. BECHBERGER.